United States Patent [19]
Spitz et al.

[11] Patent Number: 5,739,226
[45] Date of Patent: Apr. 14, 1998

[54] SOLID CATALYTIC COMPONENT CONTAINING ZIRCONIUM AND CYCLOALKADIENYL GROUPS, PROCESS FOR PRODUCING IT AND PROCESS FOR THE POLYMERIZATION OF OLEFINS IN ITS PRESENCE

[75] Inventors: Roger Spitz, Serezin; Veronique Pasquet, Lyons; Jerome Dupuy, Toulouse; Jean Malinge, Loubieng, all of France

[73] Assignee: Elf Atochem S.A., France

[21] Appl. No.: 544,699

[22] Filed: Oct. 18, 1995

[30] Foreign Application Priority Data

Oct. 21, 1994 [FR] France .................. 94 12604

[51] Int. Cl.$^6$ .............. C08F 4/643; C08F 10/02
[52] U.S. Cl. .......... 526/130; 526/124.3; 526/124.5; 526/128; 526/129; 526/160; 526/170; 526/352; 502/107; 502/117; 502/120; 502/134; 502/152; 502/154; 502/156
[58] Field of Search .............. 502/154, 152, 502/107, 117, 120, 134, 156; 526/123, 129, 130, 170, 160, 124.5, 124.3, 126, 943

[56] References Cited

U.S. PATENT DOCUMENTS

| 3,166,542 | 1/1965 | Orzechowski et al. | 526/129 X |
|---|---|---|---|
| 3,243,421 | 3/1966 | Orzechowski et al. | 526/129 X |
| 3,897,364 | 7/1975 | Colombo et al. | 526/129 X |
| 4,001,195 | 1/1977 | Wyatt | 526/130 X |
| 4,043,941 | 8/1977 | White et al. | 526/156 X |
| 4,459,372 | 7/1984 | Arena . | |
| 5,075,394 | 12/1991 | McDaniel et al. | 526/131 X |
| 5,117,020 | 5/1992 | Razavi . | |
| 5,202,398 | 4/1993 | Antberg et al. | 526/129 |
| 5,466,766 | 11/1995 | Patsidis et al. | 526/130 X |
| 5,473,028 | 12/1995 | Nowlin et al. | 526/119 X |

FOREIGN PATENT DOCUMENTS

| 0 293 815 | 12/1988 | European Pat. Off. . |
|---|---|---|
| 0 426 643 | 5/1991 | European Pat. Off. . |
| 0 585 512 | 3/1994 | European Pat. Off. . |
| 0 587 440 | 3/1994 | European Pat. Off. . |
| 59-174557 | 3/1984 | Japan . |
| 4-85306 | 3/1992 | Japan . |
| 589 209 | 1/1978 | U.S.S.R. . |
| WO 95/07305 | 3/1995 | WIPO . |

OTHER PUBLICATIONS

Database WPI, Derwent Publications Ltd., London GB; AN 84–284532 & JP-A-59 174 557 (Mitsui Eng & Shipbuild) *abrege*.

Database WPI, Dersent Publications Ltd., London, GB; AN 78–87468a & SU-A-589 209 (Phys Chem Inst) *abrege*.

Macromolecular Rapid Communications, vol. 15, No. 2, Feb. 1994 Basel pp. 139–143, XP 000432250, Soga Kazo, "Highly isospecific SiO2 . . . ".

*Primary Examiner*—Fred Teskin
*Attorney, Agent, or Firm*—Bell, Boyd & Lloyd

[57] ABSTRACT

The solid catalytic component according to the invention is obtained by a) treatment of a catalytic component support with ZrCl$_4$ or HfCl$_4$ in the gas phase, followed by a b) treatment with a solution or suspension of a compound capable of grafting a group containing the cycloalkadienyl skeleton to the Zr or Hf contained in the support. Polymerization of olefins in the presence of such a catalytic component results in polymers with low polydispersities, which polymers are obtained with high productivities.

48 Claims, No Drawings ized are present in one and the see liquid phase,

SOLID CATALYTIC COMPONENT CONTAINING ZIRCONIUM AND CYCLOALKADIENYL GROUPS, PROCESS FOR PRODUCING IT AND PROCESS FOR THE POLYMERIZATION OF OLEFINS IN ITS PRESENCE

FIELD OF THE INVENTION

The polymerization of olefins in the presence of catalysts of metallocene type has mainly been described in the homogeneous phase. In this type of polymerization, the catalyst, the olefin to be polymerized and the polyolefin synthesized are present in one and the see liquid phase, which generally involves a solvent.

BACKGROUND OF THE INVENTION

The polymerization of olefins by so-called heterogeneous processes, that is to say polymerization processes involving a solid catalytic component, has many advantages with respect to the so-called homogeneous process. In particular, polyolefins obtained by the heterogeneous processes exist in the form of grains, so that there is no need to granulate the polymerized mass, as is the case on conclusion of a homogeneous polymerization process. In contrast to heterogeneous processes, the homogeneous process furthermore involves large amounts of solvents which it is then necessary to separate from the polyolefin.

Furthermore, it is generally possible, by heterogeneous polymerization processes, to influence the morphology of the final polymer, that is to say the particle size distribution and shape of the final polymer, by varying the morphology of the solid catalytic component particles.

The difficulty in preparing solid catalytic components based on metallocene or heterogeneous processes restricts the development of these new catalysts.

The article by S. Collins et al. in Macromolécules, 1992, 25, 1780–1785 describes an attempt to prepare solid catalytic components by adsorption of compounds of formula $Cp_2ZrCl_2$ at the surface of oxide-type supports. The preparation of the component, however, comes up against the problem of the partial decomposition of the $Cp_2ZrCl_2$, so that it is difficult to enrich the surface of the support with catalytic species. This decomposition problem can, in part, be overcome by prior treatment of the surface of the support with $AlMe_3$ but, in this case, the $Cp_2ZrCl_2$ has a low tendency to be adsorbed. The solid catalytic components thus developed have a low zirconium and active catalytic species content and are, in particular for this reason, weakly active in the polymerization of olefins.

DESCRIPTION OF THE INVENTION

The present invention relates to a new solid catalytic component of metallocene type which can be used for the polymerization of olefins by heterogeneous polymerization processes and to a process for the manufacture of the catalytic component. The solid catalytic component obtained by virtue of the invention leads to polymers with narrow molecular mass distributions, that is to say whose polydispersity Mw/Mn is generally less than 4 and can even be less than 3. Low polydispersity polymers are particularly sought after for molding articles by injection because these products have excellent size stability on removal from the mold. The process according to the invention is easy and fast to implement.

Moreover, these products have a low degree of extractable material due to their low content of low molecular masses. This is particularly advantageous when questions of smell and/or of taste and/or of impurities are important, such as, for example, in the food or medical sector. Moreover, due to their low polydispersity, these products have improved optical properties and in particular excellent transparency.

Good thermal properties, such as behaviour on heat-sealing of films, are also obtained.

The solid catalytic component obtained by virtue of the invention can have a high zirconium content, greater than 2.5 weight %, and can catalyse the polymerization of olefins with high productivities.

The solid catalytic component according to the invention is capable of being obtained by a) treatment of a catalytic component support for the polymerization of olefins with a compound of formula $MCl_4$ in the gas phase, M representing a zirconium or hafnium atom, followed by b) treatment with a solution or a suspension of a compound C capable of grafting a group containing the cycloalkadienyl skeleton L to the metal atom M belonging to the species attached to the support.

A solid catalytic component comprising the stage a) above is also a subject of the present invention.

The support which it is advisable to use for the implementation of the present invention is suitable for the polymerization of olefins, that is to say that it breaks up under conventional polymerization conditions.

A person skilled in the art knows the supports capable of breaking up during polymerization. It is by virtue of this disintegration that the catalytic ingredients deposited on the support can diffuse through the polyolefin grains which are being formed and can thus continue to catalyze the polymerization.

The supports commonly used for the preparation of catalytic components of Ziegler-Natta type can be used in the context of the present invention. These supports are capable of attaching transition metal compounds such as the $MCl_4$ used in the context of the present invention.

For the implementation of the present invention, the support must preferably be sufficiently anhydrous for the species resulting from the $MCl_4$ and attached to the support to contain an M atom to which at least three chlorine atoms are bonded. This objective is generally achieved when the surface of the support no longer has adsorbed water at its surface and preferably has a surface concentration of hydroxyl groups of less than 7 $OH/nm^2$ and more preferably of less than $3OH/nm^2$. A support suitable for the implementation of the present invention preferably has a water content of less than 1 weight % of water per gram of support.

A species containing an M atom and at least three chlorine atoms will be said to be attached by the support if it remains bonded to the support even after a heat treatment at 300° C. for 4 hours and an absolute pressure of $1 \times 10^{-2}$ millibars, which can be verified by elemental analysis. The support can be of varied nature. Depending on its nature, its state of hydration and its ability to retain water, there may be cause to subject it to more or less intense dehydration treatments.

A person skilled in the art can, by routine tests, arrive at the dehydration treatment which it is advisable to apply to the support which he has chosen.

The support can be made of porous silica. In this case, before the treatment with $MCl_4$, it is generally necessary to treat this silica thermally in order to remove the water adsorbed at its surface. This heat treatment can, for example, be carried out by heating between 100° and 1000° C. and preferably between 150° and 800° C. while sweeping with an inert gas such as nitrogen or argon at atmospheric pressure or preferably under a vacuum with an absolute pressure of $1\times20^{-2}$ millibars for at least 60 min. For this heat treatment, the silica can be mixed with $NH_4Cl$ so as to accelerate the dehydration.

If this heat treatment is between 100° and 450° C., it is desirable to have it followed by a silanization treatment. This type of treatment succeeds in grafting a species derived from silicon onto the surface of the support in order to make this surface more hydrophobic. This silane can, for example, be an alkoxytrialkylsilane, such as methoxytrimethylsilane, or a trialkylchlorosilane, such as trimethylchlorosilane or triethylchlorosilane.

This silane is generally applied to the support by preparing a suspension of this support in an organic solution of the silane. This silane can, for example, be at a concentration of between 0.1 and 2 mol per liter in this solution. The solvent of this solution can be chosen from linear or branched aliphatic hydrocarbons, such as hexane or heptane, optionally substituted alicyclic hydrocarbons, such as cyclohexane, or aromatic hydrocarbons, such as toluene, benzene or xylene. The treatment of the support with the solution of the silane is generally carried out between 50° C. and 150° C. for 1 to 48 hours and with stirring.

The support can be made of activated $MgCl_2$, of the type of those conventionally used in the field of Ziegler-Natta catalysis. Activation of the $MgCl_2$ is carried out in a way known to a person skilled in the art. This activation can, for example, be carried out by grinding under an inert atmosphere. Thus, a support which can be used in the context of the present invention can be prepared by grinding a commercial anhydrous $MgCl_2$ under an inert atmosphere. The use of such a support does not require any specific dehydration treatment since the $MgCl_2$ has constantly been handled and treated under an inert atmosphere.

Activation of the $MgCl_2$ can be carried out with a complexing solvent, such as tetrahydrofuran (THF). This activation can be carried out as described in Patent Application EP 554,141. In this case, the support is provided in the form of a complex containing $MgCl_2$ and a complexing solvent for $MgCl_2$.

Such a support, handled under an inert atmosphere, does not require any specific dehydration treatment before the treatment with gaseous $MCl_4$.

The support can be made of $MgCl_2$ supported on porous silica. The $MgCl_2$ is deposited on the porous silica in a way known to a person skilled in the art, conventionally from an aqueous $MgCl_2$ solution. It is advisable that the $MgCl_2$ layer deposited is sufficiently fine not to block the pores of the silica. A layer with a monoatomic thickness is suitable. Taking into account the use of water in preparing the support, it is advisable in the present case to subject the support to an appropriate dehydration treatment so that the support has the water and hydroxyl group content characteristics mentioned above. These characteristics can be achieved for this support, for example, by heating between 100° and 700° C. and preferably between 150° and 450° C. while sweeping with an inert gas such as nitrogen or argon and preferably in the presence of a chlorinating agent at atmospheric pressure or preferably under a vacuum with an absolute pressure, for example, of $1\times10^{-2}$ millibars for at least 60 min. For this heat treatment, the support can be mixed with $NH_4Cl$ so as to accelerate the dehydration.

Treatment of the support with $MCl_4$ in the gas phase is carried out by bringing together the gas phase and the support which it is desired to enrich in $MCl_4$. This operation of bringing together can be carried out at a temperature of 160° to 450° C. This operation of bringing together must be carried out for a sufficient period of time, taking into account the magnitude of the enriching in metal M which is desired for the support. It is advisable to introduce sufficient $MCl_4$ in the gas phase to be able to achieve the desired $MCl_4$ concentration in the support. Generally, it is advisable to achieve a content of metal M in the support of greater than 2.5 weight % before the treatment with a compound containing a group containing the cycloalkadienyl skeleton.

A diluent gas for the $MCl_4$ may or may not be used. This diluent gas must be inert with respect to the support and the $MCl_4$. It can be nitrogen or argon. When no diluent gas is used, the gas phase consists solely of a $MCl_4$ partial pressure. Whether or not a diluent gas is used, the desired $MCl_4$ concentration in the gas phase can be obtained by heating solid $MCl_4$.

Treatment of the support with the gas phase can be carried out in various ways.

It is possible, for example, to pass the gas phase through a bed of the support to be treated. Taking into account the saturated vapor pressures of the $MCl_4$, this operation can be carried out by subliming the $MCl_4$ between 160° and 300° C. and by passing the gas phase, laden with $MCl_4$ vapor, through the support bed, the support bed also being brought to a temperature ranging from 160° to 300° C.

It is also possible to condense gaseous $MCl_4$ on the support brought to a temperature ranging from 160° to 300° C. and then to sublime the $MCl_4$, which has condensed on but has not become attached to the support, by bringing the latter to a temperature greater than or equal to 250° C., indeed greater than or equal to 300° C., and generally less than 450° C.

It is also possible to mix the support with an $MCl_4$ powder, to bring this mixture, in a reactor, to a temperature of between 160° C. and 300° C. under an inert atmosphere, for example of nitrogen or of argon, but without sweeping the reactor with an entrainment gas (the Schlenk tube is a suitable system), and then to remove at least most of the $MCl_4$ which is not attached to the support by sublimation, for example by applying a vacuum at the temperature of the treatment of the support, it being possible for the said vacuum to be produced at an absolute pressure, for example, of less than $1\times10^{-1}$ mbar. For this latter technique, it is advisable to produce the initial support/solid $MCl_4$ mixture with an excess of $MCl_4$ with respect to the amount of $MCl_4$ which it is desired to attach to the support. Generally, the support mass/solid $MCl_4$ mass ratio can range from 2 to 20.

After the treatment with $MCl_4$ in the gas phase, the support must be treated with a solution or a suspension of a compound C capable of grafting a group containing the cycloalkadienyl skeleton L to the metal atom M belonging to the species attached to the support and resulting from $MCl_4$, by replacement of a chlorine atom. The group L can contain from 5 to 20 carbon atoms. A group containing the cycloalkadienyl skeleton is either a cycloalkadienyl group or a substituted cycloalkadienyl group, for example substituted by a saturated or unsaturated hydrocarbon group. L can represent the cyclopentadienyl group, the indenyl group, the methylcyclopentadienyl group or the pentamethylcyclopentadienyl group.

Such a compound C can be chosen from those represented by the formulae LY or LMgX in which Y represents a lithium or sodium atom, X represents a chlorine, bromine or iodine atom and L represents a group containing the cycloalkadienyl skeleton as defined above. The solution or the suspension of the compound C contains the compound C and an organic solvent. The organic solvent must be inert with respect to the support, the species resulting from the MCl$_4$ attached to the support and the compound C. It can be chosen from aliphatic hydrocarbons, such as hexane or heptane, alicyclic hydrocarbons, such as cyclohexane, aromatic hydrocarbons, such as toluene, benzene or xylene, or ethers, such as THF or dioxane, since the solvent chosen does not dissolve any species present on or in the support, that is to say preferably dissolves less than 0.1 g/liter of the support, but dissolves the compound C chosen, preferably at more than 1 g/liter at the temperature chosen for the grafting treatment. Thus, if the support chosen contains MgCl$_2$, the use of THF, of dioxane and more generally of an ether as solvent for the solution or suspension of the compound C is not advisable because these ethers tend to dissolve MgCl$_2$. For the treatment of the support with the compound C, it is sufficient to introduce an amount of C such that the number of moles of the group L is substantially equal to the number of moles of the metal M present in the support to be treated. The L/M molar ratio is preferably greater than 0.8 and can be between 0.8 and 1.5. It is pointless to introduce a large excess of compound C and, for certain supports such as silica, such an excess is even harmful to the activity of the catalyst. If the L/M molar ratio is less than 0.8, the catalyst has a lower activity and results in polymers with higher melt indices. Surprisingly, it is preferable not to look for a stoichiometry in the region of two L groups per atom of metal M, as is the case in the prior art, which involves Cp$_2$ZrCl$_2$.

The amount of solvent to be involved must be sufficient for the support to be thoroughly impregnated with liquid during the treatment of the support with the suspension or the solution of the compound C. This treatment is generally carried out with stirring, which stirring is sufficiently slow as not to cause attrition of the support. The suspension or solution of compound C is preferably prepared by mixing compound C and solvent in the proportion of $1 \times 10^{-2}$ mol to 1 mol of compound C per liter of solvent.

Treatment of the support with the suspension or solution of C can be carried out at a temperature of between 0° and 150° C. for 1 to 20 hours.

This treatment having been carried out, it is advisable to wash the catalytic component obtained using a hydrocarbon solvent, preferably an aromatic hydrocarbon, such as toluene, benzene or xylene, and then to dry the said component, generally between 20° and 50° C., while sweeping with an inert gas such as nitrogen or argon at atmospheric pressure or under vacuum, for example at an absolute pressure of 0.1 millibar.

The catalytic component obtained by virtue of the invention can have a zirconium content equal to or greater than 2.5 weight %. It can contain zirconium atoms and groups containing the cycloalkadienyl skeleton L in proportions such that the L:Zr molar ratio is between 0.7 and 1.7 and even 0.8 and 1.5. It is pointless for the content of L groups to be such that L:Zr is greater than 1.5 and, in the case of a silica support, such an excess of L is even harmful to the activity of the catalyst. When the L:Zr ratio is less than 0.8, the smaller the L:Zr ratio, the less the catalytic component is active in polymerization and the more the polymer formed has high melt indices.

Polymers can be obtained by polymerization of at least one olefin in the presence of the catalytic component described above by suspension, solution, gas phase or bulk processes. The olefins which can be used for the polymerization are α-olefins containing from two to eight carbon atoms, such as ethylene or propylene, or their mixtures. The term polymerization which is used in the present application thus covers copolymerization reactions and the term polymer covers copolymers. Preference is given, among the α-olefin mixtures, to a mixture of ethylene and of at least one α-olefin containing from three to eight carbon atoms, the percentage of ethylene in the mixture generally being greater than 90 weight %.

The bulk, solution, suspension or gas phase polymerization processes are well known in principle to a person skilled in the art.

A bulk polymerization process consists in carrying out a polymerization in at least one of the olefins to be polymerized kept in the liquid or hypercritical state.

The solution or suspension polymerization processes consist in carrying out a solution or suspension polymerization in an inert medium and in particular in an aliphatic hydrocarbon.

For a solution polymerization process, it is possible, for example, to use a hydrocarbon containing from eight to ten carbon atoms or a mixture of these hydrocarbons. For a suspension polymerization process, it is possible, for example, to use n-heptane, n-hexane, isohexane, isobutane or a mixture of heptane isomers.

The operating conditions for these bulk, solution, suspension or gas phase polymerization processes are those which are commonly proposed for similar cases involving conventional catalytic systems of supported or unsupported Ziegler-Natta type.

For example, for a suspension or solution polymerization process, it is possible to carry out the reaction at temperatures ranging up to 250° C. and at pressures ranging from atmospheric pressure to 250 bar. In the case of a liquid propylene medium polymerization process, the temperatures can range up to the critical temperature. For a bulk polymerization process resulting in polyethylenes or copolymers which are mostly made of ethylene, it is possible to carry out the reaction at temperatures of between 130° C. and 350° C. and at pressures ranging from 200 to 3500 bar.

A gas phase polymerization process can be carried out using any reactor which makes possible a gas phase polymerization and in particular in a stirred bed and/or fluidized bed reactor.

The conditions for carrying out the gas phase polymerization, in particular temperature, pressure, injection of the olefin or olefins into the stirred bed and/or fluidized bed reactor and control of the polymerization temperature and pressure, are analogous to those proposed in the prior art for the gas phase polymerization of olefins. The reaction is generally carried out at a temperature below the melting point M.p. of the polymer or prepolymer to be synthesized, and more particularly of between +20° C. and (M.p.−5)° C., and at a pressure such that the olefin or olefins are essentially in the vapour phase.

A cocatalyst capable of activating the metal M of the catalytic component obtained by virtue of the invention must be present during the polymerization. This cocatalyst can be a linear aluminoxane, of formula

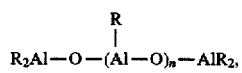

or a cyclic aluminoxane, of formula

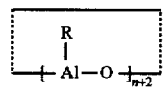

R representing an alkyl radical comprising from one to six carbon atoms and n representing an integer ranging from 2 to 40 and preferably from 10 to 20. The aluminoxane can contain R groups of different natures. The R groups preferably all represent methyl groups. Moreover, cocatalyst is also understood to mean mixtures of the abovementioned compounds.

The amounts of cocatalyst used during the polymerization must be sufficient to activate the metal M. Generally, an amount of it is introduced such that the atomic ratio of aluminium contributed by the cocatalyst to the metal M which it is desired to activate ranges from 0.5 to 20,000 and preferably from 1 to 2000.

The solution, suspension, bulk or gas phase polymerization processes can involve a chain-transfer agent, so as to control the melt index of the prepolymer or polymer to be produced. Hydrogen can be used as chain-transfer agent, the hydrogen being introduced in an amount which can range up to 90 mol %, and which preferably lies between 0.01 and 60 mol %, of the combined olefins and hydrogen conveyed to the reactor.

It is also possible to use a derivative of formula $R^1R^2R^3Al$ as chain-transfer agent, in which formula $R^1$, $R^2$ and $R^3$, which can be identical or different, each represent either a hydrogen atom or a halogen atom or an alkyl group containing from 1 to 20 carbon atoms, at least one of $R^1$, $R^2$ or $R^3$ representing an alkyl group. Mention may be made, as an example of a suitable compound, of ethylaluminium dichloride or dibromide, isobutylaluminium dichloride or dibromide, diethylaluminium chloride or bromide or iodide or hydride, di-n-propylaluminium chloride or bromide or iodide or hydride, or diisobutylaluminium chloride or bromide or iodide or hydride. In preference to the abovementioned compounds, use is made of a trialkylaluminium, such as tri-n-hexylaluminium, triisobutylaluminium, trimethylaluminium or triethylaluminium.

This derivative of formula $R^1R^2R^3Al$ can generally be introduced in polymerization so that the atomic ratio of aluminium contributed by this derivative to the metal M contained in the solid component ranges from 0.5 to 20,000 and preferably 1 to 2000.

The use of a derivative of formula $R^1R^2R^3Al$ has the advantage, in particular in comparison with hydrogen, of conferring good control on the molecular mass of the polymer. Furthermore, the influence of a derivative of formula $R^1R^2R^3Al$ on the decrease in the weight-average or number-average molecular masses is considerably greater, indeed by an order of magnitude, in the presence of the catalytic component obtained by virtue of the invention in comparison with its influence in the presence of a conventional catalytic component of Ziegler-Natta type based on Mg, Cl and Ti.

Depending on the nature of the L group, polymers with different properties can be obtained. Thus, if the L group is a cyclopentadienyl group, polymers with surprising properties can be obtained. These polymers can have both a high $I_{21}/I_5$, which can be greater than 10, and a low polydispersity Mw/Mn, which can be less than 4. These characteristics are the indication of specific molecular structures which make the polymer easy to use.

In the examples which follow, the characteristics of the supports, of the catalytic components and of the polymers obtained were determined by the following techniques:

Weight % of zirconium on the supports and the solid catalytic components: elemental analysis Melt indices of 190° C. under 5 kg and 21 kg (represented respectively by $I_5$ and $I_{21}$ in the tables): ASTM standard D1238. These indices are expressed as grams of polymer which has flowed out over 10 minutes.

Weight-average molecular mass (represented by Mw) and number-average molecular mass (represented by Mn): gel permeation chromatography at 145° C. in trichlorobenzezne. Mw/Mn represents the polydispersities, that is to say the ratio of the weight-average molecular masses to the number-average molecular masses of the polymers obtained.

The surface concentrations of hydroxyl groups on the support before treatment with $MCl_4$ were determined by the technique described in the thesis by V. Gaschard-Pasquet, Université Claude-Bernard-LYON 1, 1985. This surface concentration is expressed as number of OH groups per $nm^2$ and is indicated in the "$OH/nm^2$" column in Tables 1 and 2. In Examples 14 to 24, the supports had a surface concentration of hydroxyl groups which was not measurable and was less than 0.1 $OH/nm^2$.

In the tables, %Zr represents the percentage by weight of zirconium on the supports before grafting of an L group.

In the tables, L/Zr represents the molar ratio of the amount of groups containing the skeleton of cycloalkadienyl type introduced for the grafting to the amount of zirconium present on the support before the grafting treatment.

In the tables, Ind and Cp represent an indenyl and cyclopentadienyl group respectively.

In the examples, the initial activity of the polymerization is evaluated from the rate of consumption of monomer at the very beginning of the polymerization. It is expressed as grams of polymer formed per gram of catalytic component introduced and per hour.

In the examples, the productivity over one hour is measured by stopping the polymerization after one hour and weighing the polymer obtained. It is expressed as grams of polymer formed per gram of catalytic component introduced.

EXAMPLES 1 to 5

3 grams of silica, of trademark Grace 332 marketed by the company Grace, are brought to a temperature T (see Table 1, "T" column) for two hours under a vacuum of $1 \times 10^{-3}$ mbar, the said silica having a specific surface of 300 $m^2/g$ and a porosity of 1.65 ml/g. After returning to room temperature, this silica is mixed under argon with x grams of powdered $ZrCl_4$ (x=1.6 g for Example 1 and x=0.8 g for Examples 2 to 5), the silica/$ZrCl_4$ mixture is placed in a Schlenk tube under argon maintained at atmospheric pressure and, finally, the said tube is placed in an oven at 300° C. for 20 minutes. On conclusion of these 20 minutes, the tube, remaining at 300° C., is subjected to a vacuum of $1 \times 10^{-3}$ mbar for 30 min. so as to rid the silica of the $ZrCl_4$ which is not attached to the silica. A pressure of one atmosphere of argon is then restored in the tube, which is left to return to room temperature. A powder A is thus obtained whose zirconium content, expressed as weight %, is indicated in Table 1 (see "%Zr" column).

A suspension of indenyllithium in toluene is prepared by mixing 0.32 millimol of indenyllithium and 10 ml of toluene. Powder A, whose preparation has just been described, is then added to this suspension in an amount such that the molar ratio of the amount of indenyllithium introduced to the amount of zirconium contained in the support is in accordance with what is desired (see Table 1, "L/Zr" column). The resulting suspension is then brought to 100° C. for 4 hours with stirring. The suspension is then filtered and the solid obtained is washed with 3 times 25 ml of toluene and then 25 ml of heptane and then dried at 20° C. under a vacuum of $1 \times 10^{-3}$ mbar. After returning to room temperature under an argon atmosphere, a catalytic component according to the invention is obtained. The preparation produced by introducing 1.5 ml of a solution of methylaluminoxane (MAO) in toluene containing 10 weight % of MAO (i.e. 10 millimol of MAC on the basis of the aluminium per liter of heptane), the said MAC solution being marketed by the company Witco, into 300 ml of heptane, followed by the introduction of 15 mg of the catalytic component, is introduced under argon into a suspension polymerization reactor equipped with a stirrer and a temperature control. The atmosphere is driven off from the reactor with ethylene, the pressure is raised to 4 bar of ethylene and this pressure is maintained by injection of ethylene for 1 hour. The characteristics of the polymers obtained and some characteristics of the preparation conditions for the catalytic component are collated in Table 1.

EXAMPLES 6 to 8 (Comparative)

The powders A prepared in Examples 1, 2 and 4 are introduced directly in polymerization, that is to say without undergoing treatment with indenyllithium.

To achieve this, the procedure is as follows. The preparation produced by introducing 1.5 ml of a solution of methylaluminoxane (MAO) in toluene containing 10 weight % of MAO (i.e. 10 millimol of MAO on the basis of the aluminium per liter of heptane), the said MAO solution being marketed by the company Witco, into 300 ml of heptane, followed by the introduction of 100 mg of powder A, is introduced under argon into a suspension polymerization reactor equipped with a stirrer and a temperature control. The atmosphere is driven off from the reactor with ethylene, the pressure is raised to 4 bars of ethylene and this pressure is maintained by the injection of ethylene. It is observed that the initial activity is less than 50 grams of polyethylene per gram of powder A and per hour for the three powders A tested. Furthermore, the polymers formed are so viscous that the $I_5$ and $I_{21}$ values cannot be measured (no flow during these tests).

EXAMPLES 9 to 11

Three grams of silica, of trademark Grace 332 marketed by the company Grace, are brought to a temperature T (see Table 2, "T" column) for two hours under a vacuum of $1\times10^{-3}$ mbar. After returning to room temperature, and after having restored an absolute pressure of one atmosphere of argon, 10 ml of toluene and then x grams of $(CH_3)_3SiCl$ (x=1.5 in Examples 9 and 10 and x=1 in Example 11) are added to this silica. The suspension thus produced is then heated at 100° C. for 24 hours with stirring. The solid thus obtained, after returning to room temperature, is filtered, washed with 3 times 25 ml of toluene and then 25 ml of heptane and then dried at 20° C. under a vacuum of $1\times10^{-3}$ mbar.

The powder thus obtained is then mixed under argon with 0.8 gram of powdered $ZrCl_4$. This mixture is placed in a Schlenck tube, still under argon, and the said tube is finally placed in an oven at 300° C. for 20 minutes, the inside of the tube being maintained at atmospheric pressure and protected from all intrusion of air by a stream of argon, the said stream not sweeping the inside of the tube. On conclusion of these 20 minutes, the tube, remaining at 300° C., is subjected to a vacuum of $1\times10^{-3}$ mbar for 30 min, so as to remove the $ZrCl_4$ which has not attached to the support. A pressure of one atmosphere of argon is then restored in the tube, which is left to return to room temperature. A powder B is thus obtained whose zirconium content, expressed as weight %, is indicated in Table 2 (see "%Zr" column).

A suspension of indenyllithium in toluene is prepared by mixing 0.32 millimol of indenyllithium and 10 ml of toluene. Powder B, whose preparation has just been described, is then added to this suspension in an amount such that the molar ratio of the amount of indenyllithium introduced to the amount of zirconium contained in the support is in accordance with what is desired (see Table 2, "Ind/Zr" column). The resulting suspension is then brought to 100° C. for 4 hours with stirring. The suspension is then filtered and the solid obtained is washed with 3 times 25 ml of toluene and then 25 ml of heptane and then dried at 20° C. under a vacuum of $1\times10^{-3}$ mbar. After returning to room temperature under an argon atmosphere, a catalytic component according to the invention is obtained.

The preparation produced by introducing 1.5 ml of a solution of methylaluminoxane (MAO) in toluene containing 10 weight % of MAO (i.e. 10 millimol of MAO on the basis of the aluminium per liter of heptane), the said MAO solution being marketed by the company Witco, into 300 ml of heptane, followed by the introduction of 15 mg of the catalytic component, is introduced under argon into a suspension polymerization reactor equipped with a stirrer and a temperature control. The atmosphere is driven off from the reactor with ethylene, the pressure is raised to 4 bars of ethylene and this pressure is maintained by injection of ethylene for 1 hour. The characteristics of the polymers obtained and some characteristics of the preparation conditions for the catalytic component are collated in Table 2.

EXAMPLES 12 and 13

The powders B prepared in Examples 9 and 11 are introduced directly in polymerization, that is to say without undergoing treatment with indenyllithium. To achieve this, the procedure is as follows. The preparation produced by introducing 1.5 ml of a solution of methylaluminoxane (MAO) in toluene containing 10 weight % of MAO (i.e. 10 millimol of MAO on the basis of the aluminium per liter of heptane), the said MAO solution being marketed by the company Witco, into 300 ml of heptane, followed by the introduction of 100 mg of powder B, is introduced under argon into a suspension polymerization reactor equipped with a stirrer and a temperature control. The atmosphere is driven off from the reactor with ethylene, the pressure is raised to 4 bar of ethylene and this pressure is maintained by the injection of ethylene. It is observed that the initial activity is less than 50 grams of polyethylene per gram of powder B and per hour for the two powders B tested. Furthermore, the polymers formed are so viscous that the $I_5$ and $I_{21}$ values cannot be measured (no flow during these tests).

EXAMPLE 14

6.2 grams of silica, of trademark Grace 332 marketed by the company Grace, and a solution composed of 2.4 grams of $MgCl_2.6H_2O$ complex and of 50 ml of water are mixed. This suspension is stirred for 5 min at room temperature and then the water is removed from this suspension using a rotary evaporator, at 90° C., under a vacuum of 20 mbar at the beginning, for 20 minutes, and then under a vacuum of $1\times10^{-3}$ mbar for 30 minutes, until a non-sticky powder is obtained. The resulting powder is mixed with 1.5 grams of $NH_4Cl$ and this mixture is heated in a fluidized bed under a stream of argon at 130° C. for two hours and then at 450° C. for two hours. A powder containing 88 weight % of $SiO_2$ and 12 weight % of $MgCl_2$ is thus obtained, the $MgCl_2$ being situated at the surface of the silica.

11

This powder is treated with $ZrCl_4$ like the silica in Examples 1 to 5. A powder C is thus obtained containing 3.6 weight % of zirconium. The powder C is treated with an indenyllithium suspension as described for the powder A in Examples 1 to 4, the molar ratio of the amount of indenyllithium introduced to the amount of zirconium contained in the support being in accordance with what is desired (see Table 3, "L/Zr" column). The catalytic component thus obtained contains 3 weight % of zirconium.

The quantitative determination of the content of indenyl groups contained in the solid catalytic component is described hereinbelow:

0.5 ml of methanol is added to 120 mg of catalytic component, followed by 5 ml of aqueous HCl solution containing 12 mol of HCl per liter, and stirring is carried out for 15 minutes at room temperature. Filtration is carried out and the filter residue is washed with 4 times 20 ml of methanol. The indenyl groups of the catalytic component have thus been converted to indene, which is present in the solution which has just been prepared. 1 ml of this solution and 9 ml of methanol are mixed. The indene contained in this new solution is then quantitatively determined by measuring the UV absorbance at 250 nm and by comparison with standard solutions of indene in methanol.

The final conclusion is that the molar ratio of the amount of indenyl group contained in the catalytic component to the amount of zirconium is 0.9.

The catalytic component thus obtained is used in polymerization under conditions identical to those of the polymerization in the presence of the catalytic components of Examples 1 to 5. The results are collated in Table 3.

EXAMPLE 15

The preparation is carried out as in Example 14, except that the indenyllithium of Example 14 is replaced by cyclopentadienyllithium, the L/Zr ratio being 1.2 in this instance. The results are collated in Table 3.

EXAMPLE 16

The preparation is carried out of a complex ($MgCl_2 \cdot 1.5THF$) as described in Example No. 1 of the European Patent Application whose publication number is EP 554,141. This support is then treated with $ZrCl_4$ and then with an indenyllithium suspension, like the silica in Examples 1 to 4. The catalytic component thus obtained is used in polymerization under conditions identical to those of the polymerization in the presence of the catalytic components of Examples 1 to 5. The results are collated in Table 3.

EXAMPLE 17

The preparation is carried out as in Example 16, except that the indenyllithium of Example 16 is replaced by cyclopentadienyllithium, the L/Zr ratio being 1.1 in this instance. The results are collated in Table 3.

EXAMPLES 18 and 19

The preparation is carried out as in Example 14, except that the indenyllithium is introduced while observing an L/Zr ratio of 0.5 in Example 18 and of 3 in Example 19. The results are collated in Table 3.

EXAMPLE 20

The preparation is carried out as in Example 15, except that the cyclopentadienyllithium is introduced while observing an L/Zr ratio of 3.2. The results are collated in Table 3.

EXAMPLES 21 and 22

The preparation is carried out as in Example 14, except that, immediately after introduction of the methylaluminoxane solution, a solution of triethylaluminium (TEA) in hexane, at 2 mol of triethylaluminium per liter, is introduced at the rate of 0.3 millimole of TEA in Example 21 and 0.9 millimole of TEA in Example 22. The results are collated in Table 4. For comparison, the results of Example 14 are repeated in Table 4.

EXAMPLE 23

The catalytic component of Example 14 is used in gas phase polymerization.

Synthesis of a prepolymer:

100 g of high density polyethylene powder with a mean diameter equal to 248 μm, sieved beforehand at 400 μm, 15 ml of a solution in toluene containing 30 weight % of MAO and 0.473 g of the catalytic component synthesized in Example 14 are introduced into a 1 liter round-bottomed flask under an inert atmosphere. The mixture is homogenized and the toluene is partially evaporated under vacuum ($10^{-2}$ mbar) at room temperature until a fluid powder is obtained. This mixture is introduced into a 2.5 liter reactor equipped with a stirrer rotating at 400 rev/min, the said reactor being maintained under nitrogen and heated at 60° C. The reactor is pressurized with i bar of nitrogen and is supplied with a controlled flow rate of ethylene at 15 Sl/h for 2 hours. 134.5 g of polymer containing 120 ppm of Zr and 4000 ppm of Al are thus recovered, which corresponds to a degree of progression of approximately 300 g of prepolymer per gram of solid catalytic component.

Polymerization:

The prepolymer is used in gas phase polymerization of ethylene under the following conditions: 12 g of dry and inert polyethylene powder resulting from a polymerization identical to that now described are introduced, under an argon atmosphere at 85° C. and with stirring at 400 rev/min, into a 2.5 liter reactor equipped with a stirrer and a temperature control. 7 g of prepolymer are then introduced via a lock, and by pressurizing with argon, and ethylene is injected until a total pressure of 11 bars is obtained in the reactor (including 1 bar of argon). The pressure is kept constant by the injection of ethylene. After reacting for 100 min, the polymerization is stopped by cutting off the supply of ethylene and the reactor is decompressed, purged with argon and cooled. 152 g of polymer were thus produced (this value excludes the 12 g of dry polyethylene powder charged to the reactor before the polymerization).

The productivity was therefore 22 g of polyethylene per g of prepolymer, i.e. 6200 g of polyethylene per g of catalytic component. The polymer obtained has the following characteristics: $I_5$=1 gram/10 min, $I_{21}$=6.7 grams/10 min, $I_{21}/I_5$=6.7, Mw=150.000 grams per mole, Mw/Mn=2.5.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1

| | Preparation of the catalytic component | | | | Polymerization | | Polymers obtained | | | |
|---|---|---|---|---|---|---|---|---|---|---|
| | | | | | Initial activity | Productivity over 1 hour | | | | |
| EXAMPLE No. | T (°C.) | OH/nm$^2$ | % Zr | L/Zr | (g/g · h) | (g/g) | $I_5$ | $I_{21}$ | $I_{21}/I_5$ | Mw/Mn |
| 1 | 180 | 4 | 13 | 1.2 | 900 | 500 | 0.07 | 0.51 | 7.3 | 2.7 |
| 2 | 450 | 2 | 7.5 | 1.2 | 3400 | 1600 | 0.1 | 0.8 | 8 | 2.9 |
| 3 | 450 | 2 | 7.5 | 0.4 | 1300 | 650 | 0.1 | 0.86 | 8.6 | |
| 4 | 800 | 1 | 2.9 | 1 | 3200 | 2000 | 0.1 | 0.8 | 8 | 2.8 |
| 5 | 450 | 2 | 7.5 | 2 | 1200 | 680 | 0.1 | 0.78 | 7.8 | 2.9 |

TABLE 2

| | Preparation of the catalytic component | | | | Polymerization | | Polymers obtained | | | |
|---|---|---|---|---|---|---|---|---|---|---|
| | | | | | Initial activity | Productivity over 1 hour | | | | |
| EXAMPLE No. | T (°C.) | OH/nm$^2$ | % Zr | L/Zr | (g/g · h) | (g/g) | $I_5$ | $I_{21}$ | $I_{21}/I_5$ | Mw/Mn |
| 9 | 180 | 1.2 | 8 | 1 | 3800 | 2100 | 0.1 | 0.68 | 6.8 | 2.6 |
| 10 | 180 | 1.2 | 8 | 1.5 | 3400 | 1900 | 0.13 | 0.87 | 6.7 | 2.8 |
| 11 | 450 | 0.6 | 4.5 | 1.5 | 2500 | 1100 | 0.09 | 0.66 | 7.3 | 2.8 |

TABLE 3

| | Preparation of the catalytic component | | | | Polymerization | | Polymers obtained | | | | |
|---|---|---|---|---|---|---|---|---|---|---|---|
| | | | | | Initial activity | Productivity over 1 hour | | | | Mw | |
| EXAMPLE No. | Nature of Support | % Zr | Nature of L | L/Zr | (g/g · h) | (g/g) | $I_5$ | $I_{21}$ | $I_{21}/I_5$ | (g/mol) | Mw/Mn |
| 14 | SiO$_2$/MgCl$_2$ | 3.5 | Ind | 1 | 5500 | 2000 | 0.19 | 1.2 | 6.3 | 217,000 | 2.5 |
| 15 | SiO$_2$/MgCl$_2$ | 3.5 | Cp | 1.2 | 2700 | 1500 | 0.12 | 1.3 | 25 | 147,000 | 3.0 |
| 16 | MgCl$_2$.1.5THF | 4 | Ind | 1.2 | 700 | 400 | 0.28 | 1.8 | 6.4 | 202,000 | 2.9 |
| 17 | MgCl$_2$.1.5THF | 4 | Cp | 1.1 | 600 | 400 | 0.11 | 1.5 | 14 | 161,000 | 3.0 |
| 18 | SiO$_2$/MgCl$_2$ | 3.5 | Ind | 0.5 | 3500 | 1200 | 0.09 | 0.7 | 8 | | |
| 19 | SiO$_2$/MgCl$_2$ | 3.5 | Ind | 3 | 5000 | 1900 | 0.22 | 14 | 6.5 | | |
| 20 | SiO$_2$/MgCl$_2$ | 3.5 | Cp | 3.2 | 2500 | 1400 | 0.1 | 2 | 20 | | |

TABLE 4

| EXAMPLE No. | Amount of TEA (millimole) | Polymers obtained | | | | |
|---|---|---|---|---|---|---|
| | | $I_5$ | $I_{21}$ | $I_{21}/I_5$ | Mw | Mw/Mn |
| 14 | 0 | 0.19 | 1.2 | 6.3 | 217,000 | 2.5 |
| 21 | 0.3 | 1.11 | 7.2 | 6.5 | 146,000 | 2.5 |
| 22 | 0.9 | 6.15 | 40 | 6.5 | 84,000 | 2.4 |

We claim:

1. Process for the manufacture of a solid catalytic component, comprising treating a catalytic component support for the polymerization of olefins with a compound of formula MCl$_4$ in the gas phase, M being selected from a zirconium or hafnium atom;

wherein treatment of a support with gaseous MCl$_4$ is followed by a treatment with a solution or suspension of a compound C which grafts a group containing the cycloalkadienyl skeleton L to the metal atom M belonging to the species attached to the support, and the solid catalyst component contains at least 2.5 weight percent of zirconium or hafnium after grafting.

2. Process according to claim 1, wherein the support has a surface concentration of hydroxyl groups of less than 7 OH/nm$^2$.

3. Process according to claim 2, wherein the support has a surface concentration of hydroxyl groups of less than 3 OH/nm$^2$.

4. Process according to claim 1, wherein the support contains less than 1 weight % of water.

5. Process according to claim 1, wherein the support is made of porous silica.

6. Process according to claim 5, wherein the porous silica was subjected to a heat treatment and then to a silanization treatment.

7. Process according to claim 6, wherein the heat treatment was carried out between 100° and 450° C.

8. Process according to claim 7, wherein trimethylchlorosilane was used for the silanization treatment.

9. Process according to claim 1, wherein the support is made of activated $MgCl_2$.

10. Process according to claim 1, wherein the support is a complex ($MgCl_2$-complexing solvent for $MgCl_2$).

11. Process according to claim 10, wherein the complexing solvent is tetrahydrofuran.

12. Process according to claim 1, wherein the support is made of porous silica covered with $MgCl_2$.

13. Process according to claim 1, wherein treatment of the support with gaseous $MCl_4$ is carried out by mixing the support with an $MCl_4$ powder, followed by heating.

14. Process according to claim 1, wherein treatment of the support with gaseous $MCl_4$ is carried out at a temperature of 160° to 450° C.

15. Process according to claim 1, wherein the L group contains from 5 to 20 carbon atoms.

16. Process according to claim 15, wherein the L group is a cyclopentadienyl group.

17. Process according to claim 16, wherein the L group is an indenyl group.

18. Process according to claim 2, wherein the treatment with the compound C is carried out in the presence of a solvent which dissolves less than 0.1 g/liter of the support and which dissolves the compound C at the rate of more than 1 g/liter at the temperature chosen for the said treatment.

19. Process according to claim 18, wherein the compound C is introduced in the form of a solution or suspension at the rate of $1 \times 10^{-2}$ mol to 1 mol of compound C per liter of solvent.

20. Process according to claim 1, wherein the treatment with the compound C is carried out at a temperature of between 0° and 150° C.

21. Process according to claim 1, wherein the compound C is introduced so that the L/M molar ratio is between 0.8 and 1.5.

22. Solid catalytic component being obtained by the process of claim 1.

23. Component according to claim 22, wherein the L:Zr ratio is between 0.7 and 1.7.

24. Component according to claim 23, wherein the L:Zr ratio is between 0.8 and 1.5.

25. Solid catalytic component for the polymerization of olefins comprising at least 2.5 weight % of zirconium atoms, and groups containing a cycloalkadienyl skeleton L, the L:Zr molar ratio being between 0.7 and 1.7.

26. Process for the polymerization of at least one olefin in the presence of the catalytic component of claim 23.

27. Solid catalytic component according to claim 25, wherein the L:Zr molar ratio is between 0.8 and 1.5.

28. Process for the manufacture of a solid catalytic component,
comprising treating a catalytic component support for the polymerization of olefins with a compound of formula $MCl_4$ in the gas phase, M being selected from a zirconium or hafnium atom;
wherein treatment of a support with gaseous $MCl_4$ is followed by a treatment with a solution or suspension of a compound C which grafts a group containing the cycloalkadienyl skeleton L to the metal atom M belonging to the species attached to the support; and
wherein treatment of the support with gaseous $MCl_4$ is carried out at a temperature of 160° to 450° C.

29. Process according to claim 28, wherein the support has a surface concentration of hydroxyl groups of less than 7 $OH/nm^2$.

30. Process according to claim 29, wherein the support has a surface concentration of hydroxyl groups of less than 3 $OH/nm^2$.

31. Process according to claim 28, wherein the support contains less than 1 weight % of water.

32. Process according to claim 28, wherein the support is made of porous silica.

33. Process according to claim 32, wherein the porous silica was subjected to a heat treatment and then to a silanization treatment.

34. Process according to claim 33, wherein the heat treatment was carried out between 100°0 and 450° C.

35. Process according to claim 33, wherein trimethylchlorosilane was used for the silanization treatment.

36. Process according to claim 28, wherein the support is made of activated $MgCl_2$.

37. Process according to claim 28, wherein the support is a complex ($MgCl_2$-complexing solvent for $MgCl_2$).

38. Process according to claim 37, wherein the complexing solvent is tetrahydrofuran.

39. Process according to claim 28, wherein the support is made of porous silica covered with $MgCl_2$.

40. Process according to claim 28, wherein treatment of the support with gaseous $MCl_4$ is carried out by mixing the support with an $MCl_4$ powder, followed by heating.

41. Process according to claim 28, wherein the L group contains from 5 to 20 carbon atoms.

42. Process according to claim 41, wherein the L group is a cyclopentadienyl group.

43. Process according to claim 42, wherein the L group is an indenyl group.

44. Process according to claim 28, wherein the treatment with the compound C is carried out in the presence of a solvent which dissolves less than 0.1 g/liter of the support and which dissolves the compound C at the rate of more than 1 g/liter at the temperature chosen for the said treatment.

45. Process according to claim 44, wherein the compound C is introduced in the form of a solution or suspension at the rate of $1 \times 10^{-2}$ mol to 1 mol of compound C per liter of solvent.

46. Process according to claim 28, wherein the treatment with the compound C is carried out at a temperature of between 0° and 150° C.

47. Process according to claim 28, wherein the compound C is introduced so that the L/M molar ratio is between 0.8 and 1.5.

48. Process for the manufacture of a solid catalytic component, comprising treating a catalytic component support for the polymerization of olefins with a compound of formula $ZrCl_4$ in the gas phase, followed by a treatment with a solution or suspension of a compound C which grafts a group containing the cycloalkadienyl skeleton L to the metal atom Zr belonging to the species attached to the support, and the solid catalyst component contains at least 2.5 weight percent of zirconium after grafting.

* * * * *